United States Patent
Miyamoto

(10) Patent No.: US 12,235,443 B2
(45) Date of Patent: Feb. 25, 2025

(54) HEAD-UP DISPLAY WITH OFFSET REFLECTING MEMBER

(71) Applicant: Panasonic Intellectual Property Management Co., Ltd., Osaka (JP)

(72) Inventor: Tomoaki Miyamoto, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/232,583

(22) Filed: Aug. 10, 2023

(65) Prior Publication Data

US 2023/0384588 A1    Nov. 30, 2023

Related U.S. Application Data

(63) Continuation of application No. PCT/JP2021/045385, filed on Dec. 9, 2021.

(30) Foreign Application Priority Data

Feb. 26, 2021    (JP) .................. 2021-029650

(51) Int. Cl.
*G02B 27/01*        (2006.01)
*G02B 26/08*        (2006.01)

(52) U.S. Cl.
CPC ..... *G02B 27/0101* (2013.01); *G02B 26/0816* (2013.01); *G02B 27/0179* (2013.01);
(Continued)

(58) Field of Classification Search
CPC .................................................... G02B 27/01
See application file for complete search history.

(56) References Cited

U.S. PATENT DOCUMENTS 7,126,583 B1 * 10/2006 Breed ................. B60K 35/00
345/173
2016/0070102 A1    3/2016 Takamatsu et al.
(Continued)

FOREIGN PATENT DOCUMENTS

EP        3 006 988 A1    4/2016
JP        2004-101829 A   4/2004
(Continued)

OTHER PUBLICATIONS

Machine translation of JP 2004101829 A published Apr. 2, 2004 translated 2024 and cited in IDS. (Year: 2024).*
(Continued)

*Primary Examiner* — Gustavo Polo
(74) *Attorney, Agent, or Firm* — GREENBLUM & BERNSTEIN, P.L.C.

(57) ABSTRACT

A head-up display includes: a display that emits light showing an image from a display surface; and a mirror, wherein the image is seen as a virtual image by an observer through a windshield by the light emitted from the display surface of the display toward the mirror being reflected only by a reflecting surface of the mirror toward the windshield, and further being reflected by the windshield toward the observer, and the display surface of the display is directed downward from a direction toward the mirror from the display, and a center of the display surface of the display is located below a the center of gravity of the reflecting surface of the mirror.

2 Claims, 8 Drawing Sheets

(52) U.S. Cl.
CPC ............. *G02B 2027/0181* (2013.01); *G02B 2027/0185* (2013.01); *G02B 2027/0187* (2013.01)

(56) References Cited

U.S. PATENT DOCUMENTS

2016/0202480 A1    7/2016   Kuzuhara
2020/0285063 A1*   9/2020   Kawamura ........ G02B 27/0179

FOREIGN PATENT DOCUMENTS

| | | |
|---|---|---|
| JP | 6105531 B2 | 3/2017 |
| JP | 6710017 B2 | 6/2020 |
| JP | 2021-21829 A | 2/2021 |
| WO | 2015/098078 A1 | 7/2015 |

OTHER PUBLICATIONS

International Search Report Issued in International Patent Application No. PCT/JP2021/045385, dated Mar. 1, 2022, along with an English translation thereof.

Japanese Office Action for corresponding Japanese patent application No. 2021-029650 dated May 28, 2024, along with English translation thereof, May 20, 2024.

* cited by examiner

HEAD-UP DISPLAY WITH OFFSET REFLECTING MEMBER

CROSS REFERENCE TO RELATED APPLICATIONS

This is a continuation application of PCT International Application No. PCT/JP2021/045385 filed on Dec. 9, 2021, designating the United States of America, which is based on and claims priority of Japanese Patent Application No. 2021-029650 filed on Feb. 26, 2021.

FIELD

The present disclosure relates to a head-up display mounted on, for example, a vehicle or the like.

BACKGROUND

Conventionally, display apparatuses mounted on, for example, vehicles or the like have been proposed. (See Patent Literature (PTL) 1). The display apparatus of PTL 1 is an apparatus used as a head-up display, and includes a display device and a projection optical system. A display device displays an image. The projection optical system has two reflecting members, and uses the two reflecting members to project the image displayed on the display device onto a windshield of the vehicle. Light representing the image projected onto the windshield is reflected by the windshield toward a user, such as a driver of the vehicle. As a result, the user can see the image on the display device as a virtual image existing behind the windshield, that is, outside the vehicle.

CITATION LIST

Patent Literature

PTL 1: International Publication No. 2015/098078

SUMMARY

However, the head-up display according to PTL 1 can be improved upon.

In view of this, the present disclosure provides a head-up display capable of improving upon the above related art.

A head-up display according to an aspect of the present disclosure includes: a display that emits light showing an image from a display surface; and a reflecting member, wherein the image is seen as a virtual image by an observer through a display medium by the light emitted from the display surface of the display toward the reflecting member being reflected only by a reflecting surface of the reflecting member toward the display medium, and further being reflected by the display medium toward the observer, and the display surface of the display is directed downward from a direction toward the reflecting member from the display, and a center of the display surface of the display is located below a center of gravity of the reflecting surface of the reflecting member.

It should be noted that this comprehensive or specific aspect may be realized by a system, method, or the like, or may be realized by any combination of systems, methods, or the like.

The head-up display of the present disclosure can be further improved.

Further advantages and effects in one aspect of the present disclosure will be made clear from the specification and drawings. Such advantages and/or effects are provided by the several embodiments and the features described in the specification and drawings, respectively, but not all need to be provided to obtain one or more identical features.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
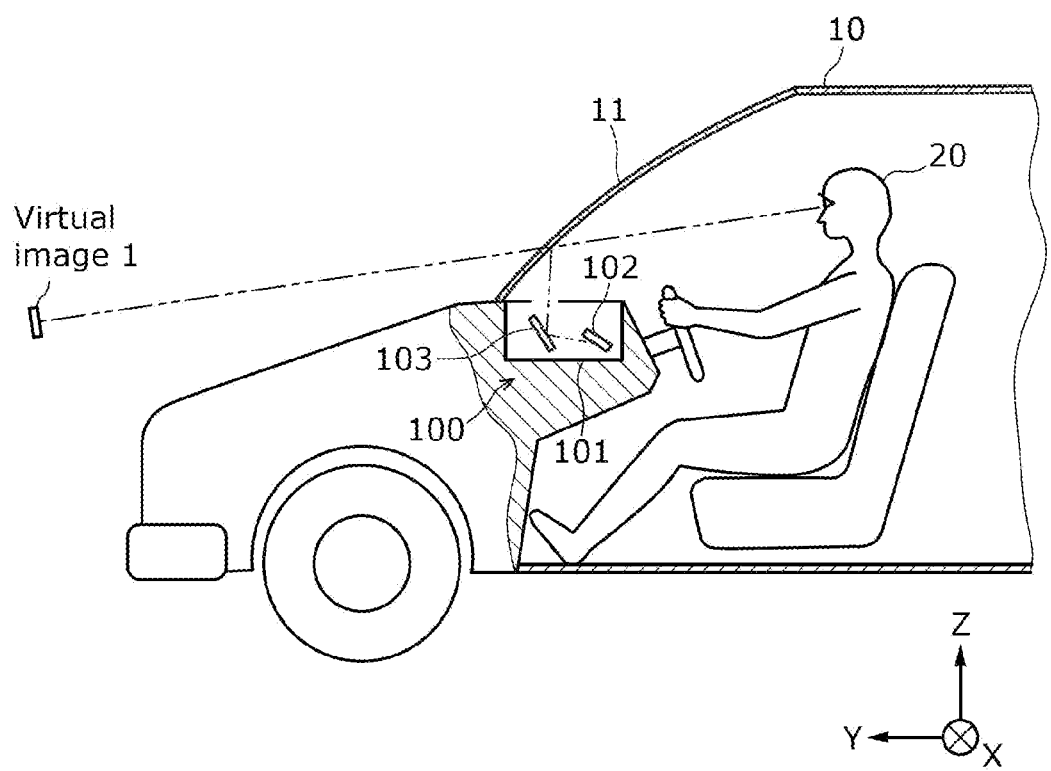
FIG. 1 is a diagram showing the arrangement and configuration of a head-up display according to an embodiment.

DESCRIPTION OF EMBODIMENT (Underlying Knowledge Forming Basis of the Present Disclosure)

The inventor of the present disclosure has found that a following problem arises with respect to the display apparatus of PTL 1 described in the "Background" section.

The display apparatus of PTL 1 includes a projection optical system that projects an image displayed on the display device onto the windshield. This projection optical system includes a first mirror which is a free-form surface and has a convex reflecting surface, and a second mirror which is a free-form surface and has a concave reflecting surface.

In such a display apparatus, if the optical path length in the projection optical system is shortened, the magnification of the image can be increased and the size can be reduced. However, if the optical path length is shortened, there is a problem that the eye box of the user tends to become narrow. That is, the light projected from the display device to display an image may physically interfere with any one of the first mirror, the second mirror, and the display device, making it difficult for the light to reach the user's eyes.

In order to solve such a problem, a head-up display according to an aspect of the present disclosure includes a display that emits light showing an image from a display surface; and a reflecting member, wherein the image is seen as a virtual image by an observer through a display medium by the light emitted from the display surface of the display toward the reflecting member being reflected only by a reflecting surface of the reflecting member toward the display medium, and further being reflected by the display medium toward the observer, and the display surface of the display is directed downward from a direction toward the reflecting member from the display, and a center of the display surface of the display is located below a the center of gravity of the reflecting surface of the reflecting member. It should be noted that the reflecting member is, for example, a mirror, and the display medium is, for example, a windshield.

Accordingly, the light emitted from the display surface of the display toward the reflecting member is reflected only by the reflecting surface of the reflecting member and directed toward the display medium. That is, in the head-up display according to one aspect of the present disclosure, only one reflecting member is used to guide the light from the display to the display medium. Therefore, the size of the head-up display can be easily reduced compared to other head-up displays having a plurality of reflecting members. Furthermore, since the display surface of the display is directed downward from the direction from the display toward the reflecting member, stray light of sunlight can be suppressed. That is, even if the sunlight is reflected by the reflecting member toward the display and is further reflected by the display surface of the display, the reflected sunlight can be suppressed from returning to the reflecting member. As a result, sunlight reflected on the display surface can be suppressed from traveling toward the observer via the reflecting member and the display medium, and stray light can be suppressed. If the display surface of the display is merely turned downward, the optical path lengths from the upper end and the lower end of the display surface to the observer are different, resulting in large aberrations such as distortion in the image seen as a virtual image. However, in the head-up display according to one aspect of the present disclosure, the center of the display surface of the display is located below the center of gravity of the reflecting surface of the reflecting member. Accordingly, the optical path lengths from the upper end and the lower end of the display surface to the observer can be made substantially equal, and aberration can be suppressed. It should be noted that aberrations are, for example, curvature of field, distortion, and the like.

It should be noted that conversely, it is also possible to suppress stray light by directing the display surface of the display upward, and to suppress aberration by disposing the center of the display surface of the display upward. However, in this case, the light reflected toward the display medium by the reflecting member is likely to physically interfere with the display, and as a result, the observer's eye box may become narrow. Therefore, in the head-up display according to one aspect of the present disclosure, it is possible to reduce the size while suppressing the occurrence of aberration, the occurrence of stray light, and the narrowing of the eye box.

In addition, the center of the display surface of the display may be located to a left or right side of the center of gravity of the reflecting surface of the reflecting member.

For example, the light reflected by the reflecting member hits the irradiation range on the display medium, is reflected by the irradiation range, and travels toward the observer. Here, the right end of the irradiation range on the display medium may be closer to the reflecting member side than the left end, and conversely, the left end of the irradiation range on the display medium may be closer to the reflecting member side than the right end. In such cases, the optical path length from the display to the observer via the left end of the reflecting surface of the reflecting member and the left end of the irradiation range may differ from the optical path length from the display to the observer via the right end of the reflecting surface of the reflecting member and the right end of the irradiation range. As a result, aberration such as distortion aberration in an image seen as a virtual image increases. As such, for example, the aberration can be suppressed by rotating the reflecting member so that one of the left and right ends of the reflecting member is closer to the display medium side than the other. However, rotating the reflecting member may increase the width of the head-up display along the direction from the reflecting member toward the display medium. That is, the head-up display may become large. However, in the head-up display according to one aspect of the present disclosure, since the center of the display surface of the display is located to the left or right side of the center of gravity of the reflecting surface of the reflecting member, the two optical path lengths described above can be made substantially equal without rotating the reflecting member. As a result, it is possible to reduce the size of the head-up display while further suppressing the occurrence of aberration.

In addition, the head-up display may be mounted on a vehicle, the display medium may be a windshield above the reflecting member, when a steering wheel of the vehicle is a left steering wheel attached on a left side of the vehicle, the center of the display surface of the display may be located to the right side of the center of gravity of the reflecting surface of the reflecting member, and when the steering wheel of the vehicle is a right steering wheel attached on a right side of the vehicle, the center of the display surface of the display may be located to the left side of the center of gravity of the reflecting surface of the reflecting member. Specifically, in a coordinate system on a tangential plane tangential to the center of gravity of the reflecting surface of the reflecting member, the coordinate system having the center of gravity of the reflecting surface as an origin, the coordinate system having an X-axis and a Y-axis orthogonal to each other at the origin, the coordinate system having the X-axis which is along a left-right direction, when the reflecting surface is viewed from a side of the display in a direction perpendicular to the tangential plane, when the steering wheel is the left steering wheel, the center of the display surface of the display may be located in a fourth quadrant of the coordinate system, and when the steering wheel is the right steering wheel, the center of the display surface of the display may be located in a third quadrant of the coordinate system.

For example, when the observer is a driver and the head-up display is provided on the dashboard of the vehicle, the head-up display is shifted to the left or right depending on the position of the steering wheel. That is, if the steering wheel is a left steering wheel mounted on the left side of the vehicle, the head-up display will also be shifted to the left side. Conversely, if the steering wheel is a right steering wheel mounted on the right side of the vehicle, the head-up display will also be shifted to the right side. Here, in the windshield of a vehicle, the end of the windshield is closer to the dashboard than the central portion in the left-right direction of the windshield. Therefore, in the case of the left steering wheel, the left end of the irradiation range on the windshield is closer to the reflecting member than the right end. In such a case, in the head-up display according to one aspect of the present disclosure, the center of the display surface of the display is located to the right of the center of gravity of the reflecting surface of the reflecting member. Accordingly, the two optical path lengths described above can be made substantially equal. On the other hand, in the case of the right steering wheel, the right end of the irradiation range on the windshield is closer to the reflecting member than the left end. In such a case, in the head-up display according to one aspect of the present disclosure, the center of the display surface of the display is located to the left of the center of gravity of the reflecting surface of the reflecting member. Accordingly, the two optical path lengths described above can be made substantially equal. As a result, regardless of whether the steering wheel is the left steering wheel or the right steering wheel, it is possible to reduce the size of the head-up display while further suppressing the occurrence of aberration.

In addition, a head-up display according to an aspect of the present disclosure includes: a display that emits light showing an image from a display surface; and a reflecting member, wherein the image is seen as a virtual image by an observer through a display medium by the light emitted from the display surface of the display toward the reflecting member being reflected only by a reflecting surface of the reflecting member toward the display medium, and further being reflected by the display medium toward the observer, and a center of the display surface of the display is located to a left or right side of a the center of gravity of the reflecting surface of the reflecting member.

Accordingly, the light emitted from the display surface of the display toward the reflecting member is reflected only by the reflecting surface of the reflecting member and directed toward the display medium. That is, in the head-up display according to one aspect of the present disclosure, only one reflecting member is used to guide the light from the display to the display medium. Therefore, the size of the head-up display can be easily reduced compared to other head-up displays having a plurality of reflecting members. Furthermore, the two optical path lengths described above can be made substantially equal without rotating the reflecting member. As a result, it is possible to reduce the size of the head-up display while suppressing the occurrence of aberration.

Hereinafter, an embodiment will be specifically described with reference to the drawings.

It should be noted that the embodiment described below shows all comprehensive or specific examples. Numerical values, shapes, materials, components, arrangement positions and connection forms of the components, and the like shown in the following embodiment are examples, and are not intended to limit the present disclosure. In addition, among the components in the following embodiment, the components not described in independent claims indicating the broadest concept are described as arbitrary components.

In addition, each figure is a schematic diagram and is not necessarily exactly illustrated. In addition, in each figure, the same reference numerals are denoted to the same components.

Furthermore, terms such as parallel in the following embodiment mean not only exact parallelism, but also substantial parallelism, and may have an error of several percent. That is, parallelism is parallelism within the range where the effects of the following embodiment can be achieved. The same is true for terms such as perpendicular or orthogonal other than parallel.

Embodiment

FIG. 1 is a diagram showing the arrangement and configuration of a head-up display according to the present embodiment. It should be noted that in the present embodiment, the vertical direction is referred to as the Z-axis direction, the longitudinal direction of vehicle 10 is referred to as the Y-axis direction, and the left-right direction of vehicle 10 is referred to as the X-axis direction. The positive side of the Z-axis is upward, above, upper direction, or upside, and the negative side of the Z-axis is downward, below, lower direction, or downside. The Y-axis direction is parallel to the horizontal direction, and the positive side of the Y-axis direction is front, forward, anterior direction, or front side, and the negative Y-axis direction is rear, rearward, posterior direction, or rear side. The X-axis direction is parallel to the horizontal direction, the positive side of the X-axis direction is right, rightward, or right side, and the negative X-axis direction is left, leftward, or left side.

Head-up display 100 according to the present embodiment is mounted, for example, on vehicle 10 to form virtual image 1. This virtual image 1 is seen by observer 20 who is a driver of vehicle 10 so as to exist, for example, on the front outside of vehicle 10. Such head-up display 100 includes housing 101, display 102, and mirror 103.

Housing 101 is, for example, a resin molded product and is located inside the dashboard of vehicle 10. In addition, housing 101 accommodates display 102 and mirror 103.

Display 102 emits light representing an image from the display surface. That is, display 102 displays an image seen as virtual image 1 by observer 20. Display 102 is, for example, a picture generation unit (PGU) having a liquid crystal display (LCD). It should be noted that display 102 may include a device other than the LCD, such as an organic light emitting diode (electroluminescence), a fluorescent display apparatus (seven segment), a plasma display, or the like. In addition, display 102 may be a projector or a scanning laser. It should be noted that the light representing an image emitted from display 102 is hereinafter also referred to as image light.

Mirror 103 is an example of a reflecting member. This mirror 103 forms virtual image 1 on the opposite side of windshield 11 from observer 20 by guiding the image light emitted from display 102 to windshield 11. That is, upon receiving the image light emitted from the display surface of display 102, mirror 103 reflects the image light toward windshield 11. For example, mirror 103 reflects light to the upper side of vehicle 10. As a result, when windshield 11 receives the image light from mirror 103, it reflects the image light toward the pupil of observer 20. Accordingly, observer 20 can see an object such as a road, a pedestrian, or a structure on the front outside of vehicle 10 through windshield 11 and virtual image 1 superimposed on the object. It should be noted that mirror 103 is a component included in a projection optical system that projects an image displayed on display 102 onto windshield 11. In addition, the projection optical system may also include other components such as windshield 11.

In head-up display 100 of such a present embodiment, the image light emitted from the display surface of display 102 toward mirror 103 is reflected only by the reflecting surface of mirror 103 and travels toward windshield 11. The image light is further reflected by windshield 11 toward observer 20. Accordingly, the image on display 102 is seen by observer 20 as virtual image 1 through windshield 11. It should be noted that windshield 11 is an example of a display medium and is above mirror 103.

Therefore, in head-up display 100 of the present embodiment, only one mirror is used to guide the image light of display 102 to windshield 11. As a result, the size of head-up display 100 can be easily reduced compared to other head-up displays having a plurality of mirrors.

Figure 2:
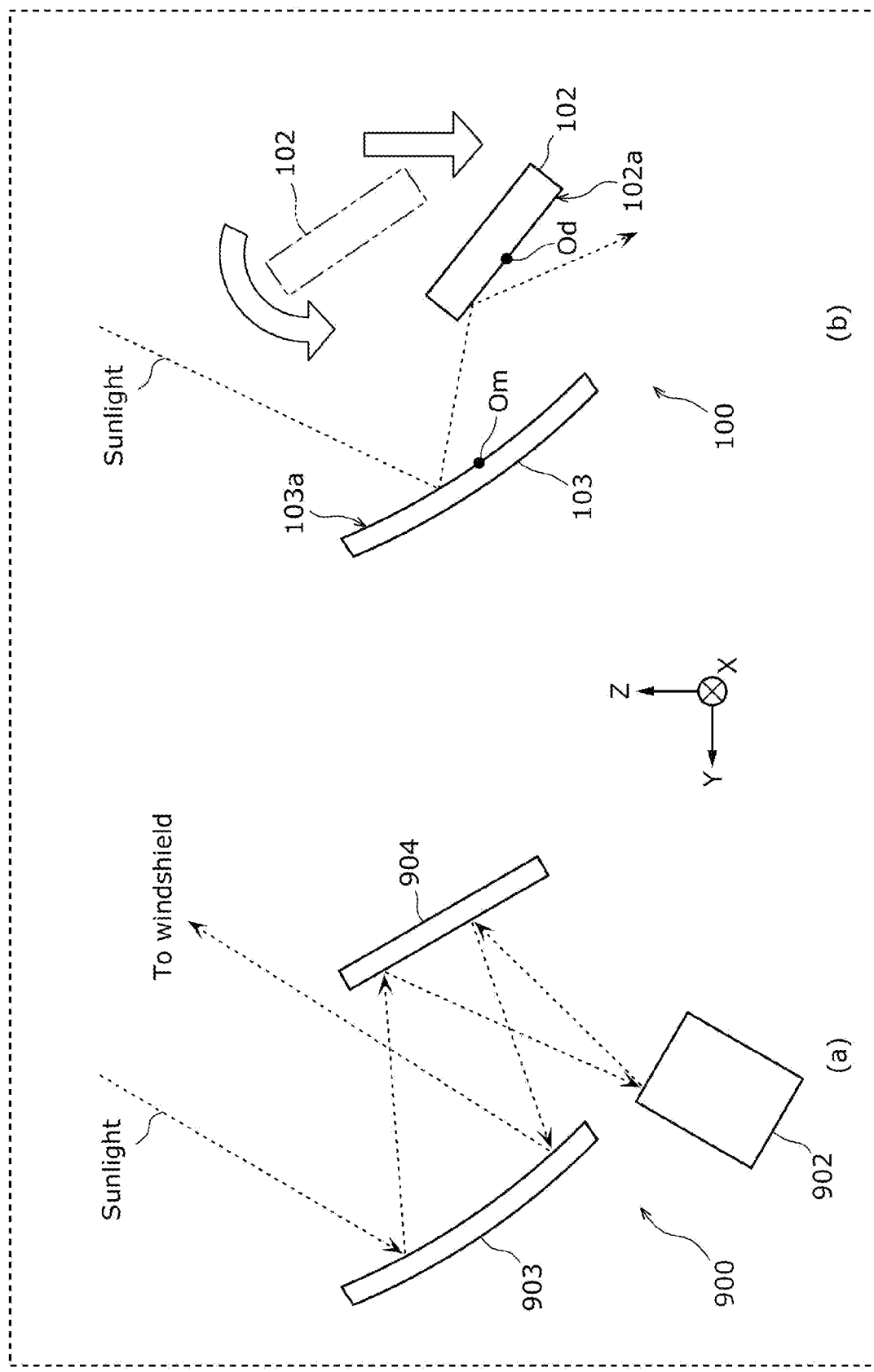
FIG. 2 is a diagram showing in detail an example of the arrangement of a mirror and a display according to the embodiment.

FIG. 2 is a diagram showing in detail an example of the arrangement of mirror 103 and display 102 in the present embodiment. It should be noted that (a) in FIG. 2 shows a configuration example of another head-up display 900 compared with head-up display 100 in the present embodiment, and (b) in FIG. 2 shows a configuration example of head-up display 100.

For example, head-up display 900 includes display 902 and two mirrors 903 and 904. In such head-up display 900, display 902 displays an image. Image light, which is light representing the image, is emitted from display 902 toward mirror 904 and reflected by mirror 904. The image light reflected by mirror 904 is directed to mirror 903 and is further reflected by mirror 903. Image light reflected by mirror 903 is directed to the windshield.

Here, in order to reduce the size of head-up display 900 and to increase the magnification of an image seen as a virtual image, it is conceivable to shorten the optical path between mirrors 903 and 904. However, when the optical path is shortened, sunlight tends to appear as stray light. That is, as shown in (a) in FIG. 2, the sunlight entering the interior of the vehicle through the windshield is reflected by mirrors 903 and 904 and directed toward the display surface of display 902. This sunlight is reflected by the display surface of display 902, is further reflected by mirrors 904 and 903, and travels toward the windshield again. As a result, the sunlight is reflected in the virtual image as stray light.

As such, head-up display 100 according to the present embodiment includes one mirror 103 instead of a plurality of mirrors, as shown in (b) in FIG. 2. That is, the number of mirrors included in the projection optical system for guiding the image light emitted from display 102 to windshield 11 is only one. Accordingly, the thickness of head-up display 100 in the Z-axis direction can be reduced. That is, it is possible to easily reduce the size of head-up display 100. Furthermore, by shortening the optical path length from display 102 to windshield 11, the magnification of the image seen as virtual image 1 can be increased. That is, virtual image 1 seen by observer 20 can be enlarged. In addition, display 102 can be kept away from mirror 103 while shortening the optical path length described above. As a result, the aforementioned stray light can be easily suppressed.

That is, display surface 102a of display 102 in the present embodiment is directed downward from the direction from display 102 toward mirror 103, as shown in (b) in FIG. 2. That is, display surface 102a is tilted downward. Accordingly, even if the sunlight entering the interior of vehicle 10 from windshield 11 is reflected by mirror 103 toward display 102, the sunlight can be reflected below mirror 103 by display surface 102a of display 102. That is, it is possible to prevent sunlight from being reflected again from display 102 toward mirror 103. Accordingly, the stray light of sunlight can be suppressed.

In addition, center Od of display surface 102a of display 102 in the present embodiment is located below the center of gravity Om of reflecting surface 103a of mirror 103. Accordingly, aberrations such as distortion and curvature of field appearing in the image seen as virtual image 1 can be suppressed. Suppression of the aberrations will be described below with reference to FIG. 3.

Figure 3:
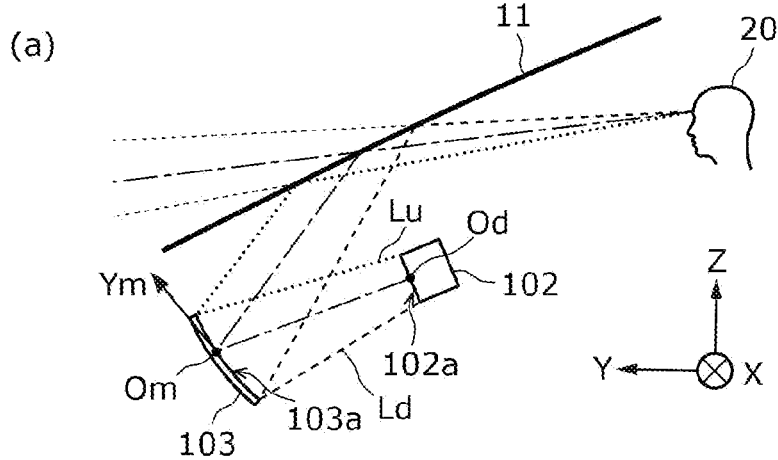
FIG. 3 is a diagram showing an optical path from the display to the observer when viewed from the left-right direction, according to the embodiment.
Figure 3:
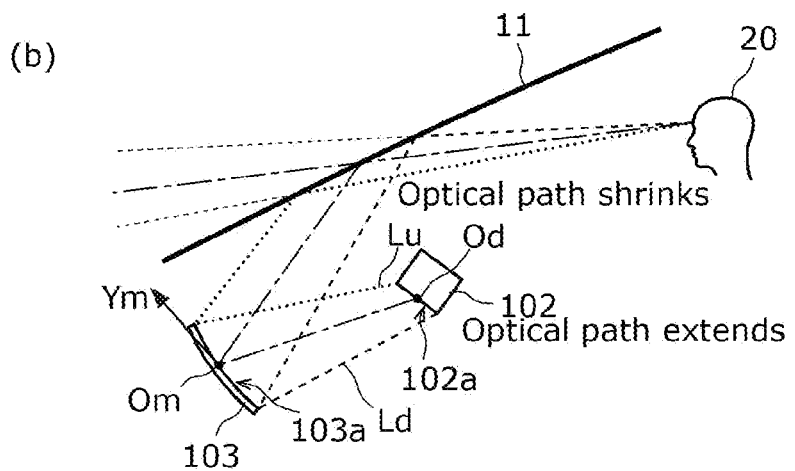
Figure 3:
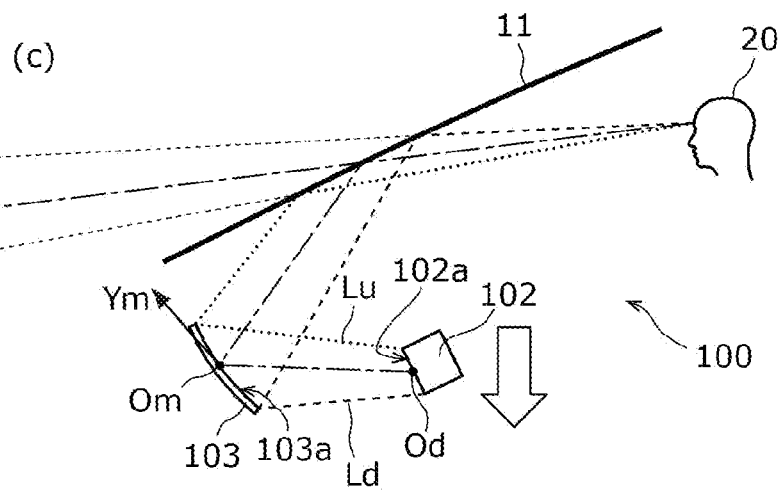

FIG. 3 is a diagram showing optical paths from display 102 to observer 20 when viewed from the left-right direction. Specifically, (a) in FIG. 3 shows the optical path when display surface 102a of display 102 is directed to mirror 103, and (b) in FIG. 3 shows the optical path when display surface 102a of display 102 is directed downward. (c) in FIG. 3 shows the optical path when display surface 102a is directed downward and display 102 is moved downward, in head-up display 100 of the present embodiment. That is, (a) and (b) in FIG. 3 show examples of other optical paths compared with head-up display 100 of the present embodiment. It should be noted that FIG. 3 shows the Ym axis in the mirror coordinate system. The mirror coordinate system is a coordinate system on a tangential plane tangential to the center of gravity Om of reflecting surface 103a of mirror 103, the origin of the mirror coordinate system is the center of gravity Om, and the Ym axis is an axis which is perpendicular to the horizontal direction, and passes through the origin. It should be noted that the positive side in the Ym-axis direction is above the origin, and the negative side in the Y-axis direction is below the origin.

For example, as shown in (a) in FIG. 3, display surface 102a of display 102 faces mirror 103, that is, display surface 102a is directed to mirror 103. In this case, in order to suppress the aberration of the image seen as virtual image 1, optical path Lu of the image light emitted from the upper end side of display surface 102a toward observer 20 and optical path Ld of the image light emitted from the lower end side of display surface 102a toward observer 20 are needed to have approximately the same lengths. As such, in this case, center Od of display surface 102a is located, for example, to the positive side in the Ym-axis direction of the center of gravity Om of reflecting surface 103a of mirror 103.

Here, in order to suppress the aforementioned stray light, display surface 102a of display 102 is directed downward as shown in (b) in FIG. 3. Thus, when display surface 102a is directed downward, the lengths of optical paths Lu and Ld change, respectively. That is, optical path Lu becomes shorter and optical path Ld becomes longer. As a result, aberration increases.

As such, in the present embodiment, center Od of display surface 102a is located below the center of gravity Om of reflecting surface 103a of mirror 103 in order to reduce the aberration while suppressing the stray light. That is, center Od of display surface 102a is located, for example, to the negative side of the center of gravity Om of reflecting surface 103a of mirror 103 in the Ym-axis direction. Accordingly, optical path Lu becomes longer from the state shown in (b) in FIG. 3, optical path Ld becomes shorter from the state shown in (b) in FIG. 3, and the respective lengths of optical paths Lu and Ld can be made approximately equal. As a result, various aberrations, especially curvature of field and distortion can be suppressed.

Thus, in the present embodiment, since display surface 102a of display 102 is directed downward from the direction from display 102 toward mirror 103, stray light of sunlight can be suppressed. That is, even if the sunlight is reflected by mirror 103 toward display 102 and is further reflected by display surface 102a of display 102, the reflected sunlight can be prevented from returning to mirror 103. As a result, the sunlight reflected on display surface 102a can be suppressed from traveling toward observer 20 via mirror 103 and windshield 11, and stray light can be suppressed. Furthermore, in the present embodiment, center Od of display surface 102a of display 102 is located below the center of gravity Om of reflecting surface 103a of mirror 103. Accordingly, the optical path lengths from the upper end and the lower end of display surface 102a to observer 20 can be made approximately the same, and aberration can be suppressed.

It should be noted that conversely, it is possible to suppress stray light by directing display surface 102a of display 102 upward, and it is also possible to suppress aberration by further placing center Od of display surface 102a of display 102 upward. However, in this case, the image light reflected toward windshield 11 by mirror 103 is likely to physically interfere with display 102, and as a result, the eye box of observer 20 may become narrow. Therefore, in head-up display 100 of the present embodiment, it is possible to reduce the size while suppressing the occurrence of aberration, the occurrence of stray light, and the narrowing of the eye box.

Figure 4:
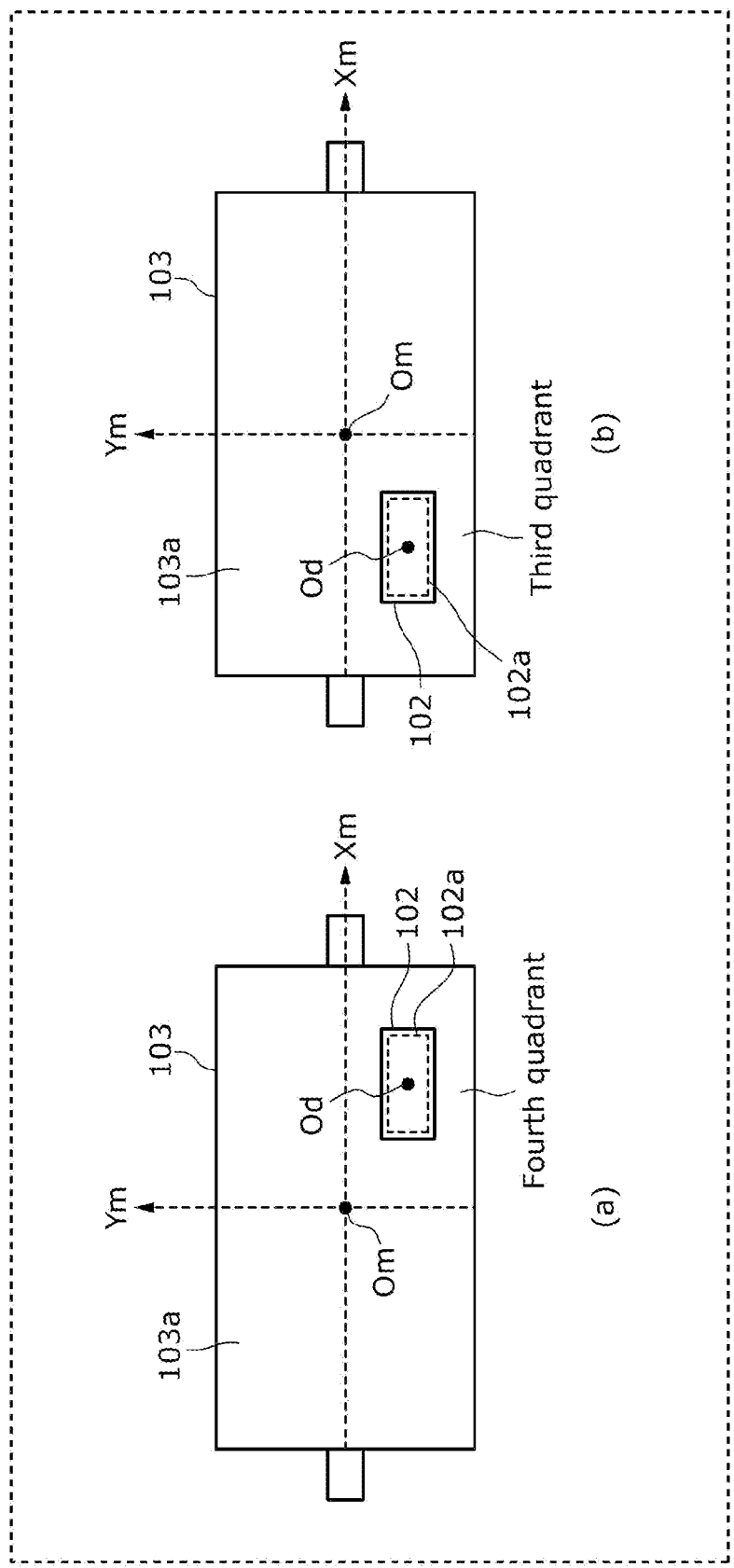
FIG. 4 is a diagram showing an example of a positional relationship between a mirror and a display in the mirror coordinate system according to the embodiment.

FIG. 4 is a diagram showing an example of the positional relationship between mirror 103 and display 102 in the mirror coordinate system. It should be noted that (a) in FIG. 4 is a diagram showing an example of the positional relationship when the steering wheel of vehicle 10 is a left steering wheel attached on the left side of vehicle 10. In addition, (b) in FIG. 4 is a diagram showing an example of the positional relationship when the steering wheel of vehicle 10 is a right steering wheel attached on the right side of vehicle 10. In addition, (a) and (b) in FIG. 4 show an example of the positional relationship when display 102 and reflecting surface 103a are viewed from the display 102 side along the direction perpendicular to the Xm axis and the Ym axis in the mirror coordinate system. It should be noted that the Xm axis is an axis which is along the left-right direction, which passes through the center of gravity Om, which is the origin, and is orthogonal to the Ym axis.

As shown in (a) and (b) in FIG. 4, center Od of display surface 102a of display 102 in the present embodiment is located to the left or right side of the center of gravity Om of reflecting surface 103a of mirror 103.

When the observer is the driver and the steering wheel is the left steering wheel, center Od of display surface 102a of display 102 is located to the right side of the center of gravity Om of reflecting surface 103a of mirror 103, as shown in (a) in FIG. 4. Specifically, center Od of display surface 102a of display 102 is located in the fourth quadrant of the mirror coordinate system.

When the observer is the driver and the steering wheel is the right steering wheel, center Od of display surface 102a of display 102 is located to the left side of the center of gravity Om of reflecting surface 103a of mirror 103, as shown in (b) in FIG. 4. Specifically, center Od of display surface 102a of display 102 is located in the third quadrant of the mirror coordinate system.

Thus, in the present embodiment, center Od of display surface 102a is located to the left or right side of the center of gravity Om of reflecting surface 103a, so that the aberration can be further suppressed and the size can be reduced. Suppression of the aberration and miniaturization will be described below with reference to FIG. 5.

Figure 5:
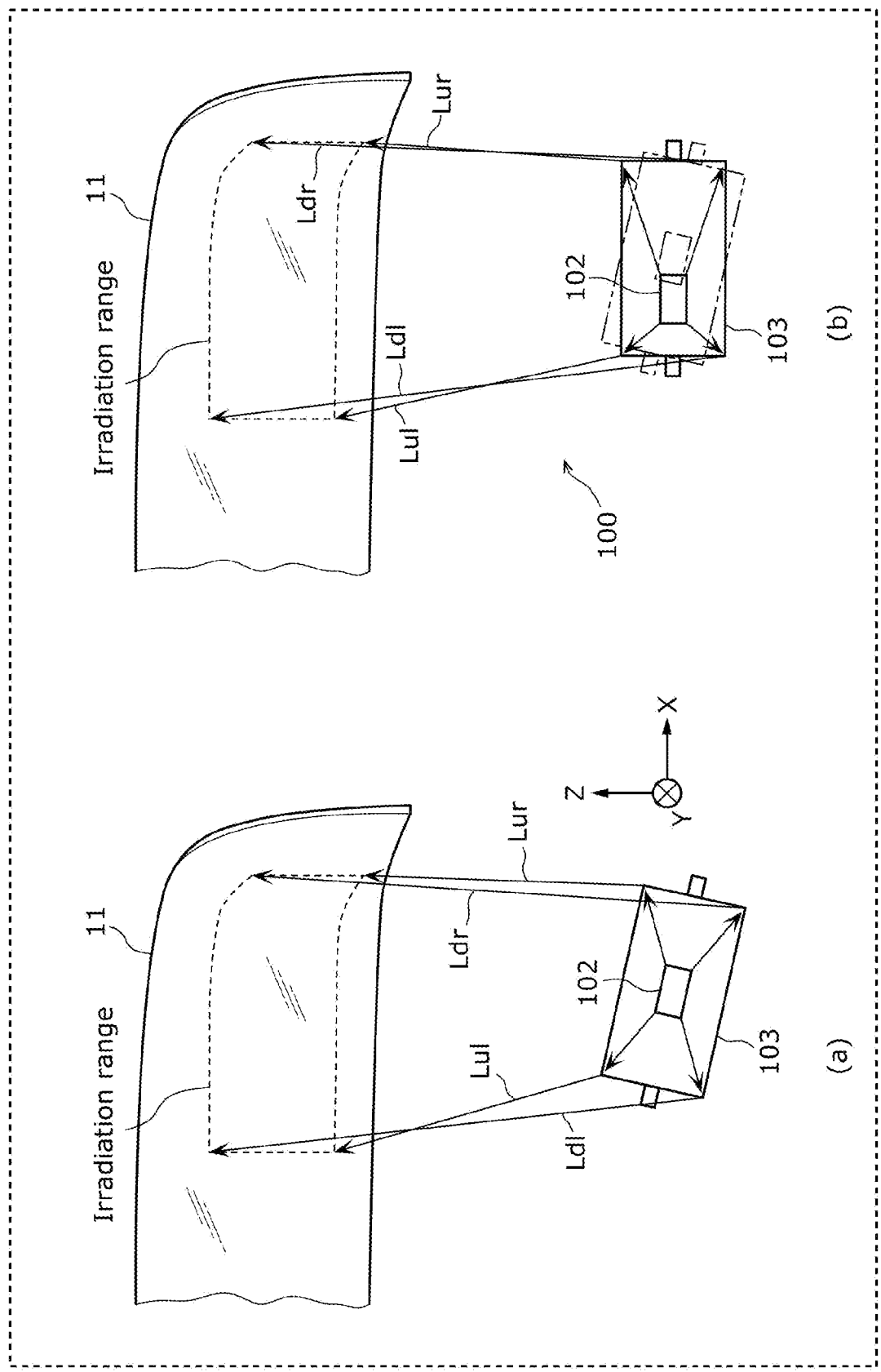
FIG. 5 is a diagram showing that the rotation of the mirror according to the embodiment is suppressed.

FIG. 5 is a diagram showing that the rotation of mirror 103 is suppressed in the embodiment. It should be noted that (a) in FIG. 5 shows a state in which center Od of display surface 102a of display 102 is located at the center of gravity Om of reflecting surface 103a of mirror 103. (b) in FIG. 5 shows a state in which center Od of display surface 102a of display 102 is located to the left of the center of gravity Om of reflecting surface 103a of mirror 103, in the head-up display 100 according to the present embodiment. That is, (a) in FIG. 5 shows another arrangement example compared with head-up display 100 of the present embodiment.

The image light reflected by mirror 103 hits the irradiation range on windshield 11 and is reflected by the irradiation range toward observer 20, as shown in (a) and (b) in FIG. 5.

Here, when head-up display 100 is provided on the dashboard of vehicle 10, head-up display 100 is shifted to the left or right depending on the position of the steering wheel. That is, when the steering wheel is the right steering wheel, head-up display 100 is also shifted to the right side. In addition, in windshield 11 of vehicle 10, the ends of windshield 11 in the left-right direction are closer to the dashboard than the central portion thereof. Therefore, in the case of the right steering wheel, the right end of the irradiation range on windshield 11 is closer to mirror 103 than the left end thereof. In such a case, right optical paths Lur and Ldr are shorter than left optical paths Lul and Ldl. As a result, in the image seen as virtual image 1, aberrations such as curvature of field and distortion become large. It should be noted that each of optical paths Lul and Ldl is an optical path from display 102 to observer 20 via the left end of reflecting surface 103a of mirror 103 and the left end of the irradiation range. Each of optical paths Lur and Ldr is an optical path from display 102 to observer 20 via the right end of reflecting surface 103a of mirror 103 and the right end of the irradiation range.

As such, if mirror 103 is rotated so that the left end of mirror 103 approaches windshield 11 and conversely, the right end of mirror 103 moves away from windshield 11 as shown in (a) in FIG. 5, the aberration can be suppressed. However, rotating mirror 103 may increase the width of head-up display 100 along the direction from mirror 103 toward windshield 11. That is, head-up display 100 may become large.

However, in head-up display 100 according to the present embodiment, as shown in (b) in FIG. 5, when the observer is the driver and the steering wheel is the right steering wheel, center Od of display surface 102a of display 102 is located to the left side of reflecting surface 103a of mirror 103. Therefore, without rotating mirror 103 as shown in (a) in FIG. 5, each length of left optical paths Lul and Ldl can be made substantially equal to each length of right optical paths Lur and Ldr. As a result, it is possible to reduce the size of head-up display 100 while further suppressing the occurrence of aberration.

It should be noted that in the example shown in FIG. 5, the steering wheel is the right steering wheel, but in the case of the left steering wheel, center Od of display surface 102a of display 102 is located to the right side of the center of gravity Om of reflecting surface 103a of mirror 103 as shown in (a) in FIG. 4. Accordingly, similarly to the above, each length of left optical paths Lul and Ldl can be made substantially equal to each length of right optical paths Lur and Ldr without rotating mirror 103. As a result, even in the case of the left steering wheel, as in the case of the right steering wheel, it is possible to reduce the size of head-up display 100 while further suppressing the occurrence of aberration.

In addition, in the present embodiment, center Od of display surface 102a of display 102 is located below the center of gravity Om of reflecting surface 103a of mirror 103 regardless of whether the steering wheel is the right steering wheel or the left steering wheel. That is, center Od of display surface 102a of display 102 is located in the third or fourth quadrant of the mirror coordinate system. Therefore, while display surface 102a of display 102 faces downward, the length of left optical path Lul and the length of optical path Ldl can be made substantially equal, and the length of right optical path Lur and the length of optical path Ldr can be made substantially equal. It should be noted that optical path Lul is an optical path from display 102 toward observer 20 via the upper left end of reflecting surface 103a of mirror 103 and the lower left end of the irradiation range. Optical path Ldl is an optical path from display 102 toward observer 20 via the lower left end of reflecting surface 103a of mirror 103 and the upper left end of the irradiation range. Similarly, optical path Lur is an optical path from display 102 toward observer 20 via the upper right end of reflecting surface 103a of mirror 103 and the lower right end of the irradiation range. Optical path Ldr is an optical path from display 102 toward observer 20 via the lower right end of reflecting surface 103a of mirror 103 and the upper right end of the irradiation range.

As described above, in the present embodiment, it is possible to reduce the size of head-up display 100 while suppressing the occurrence of aberration, the occurrence of stray light, and the narrowing of the eye box.

It should be noted that in the embodiment described above, display surface 102a of display 102 is directed downward, and center Od of display surface 102a of display 102 is located below the center of gravity Om of reflecting surface 103a of mirror 103. However, the orientation of display surface 102a and the arrangement of center Od of display surface 102a need not be limited to such a state. That is, center Od of display surface 102a of display 102 may be located to the left or right side of the center of gravity Om of reflecting surface 103a of mirror 103 when display surface 102a of display 102 is not in the aforementioned state. Even in such a case, it is possible to reduce the size of head-up display 100 while suppressing the occurrence of aberration.

NUMERICAL EXAMPLES

Specific Numerical examples of head-up display 100 according to the present embodiment will be described below.

Figure 6:
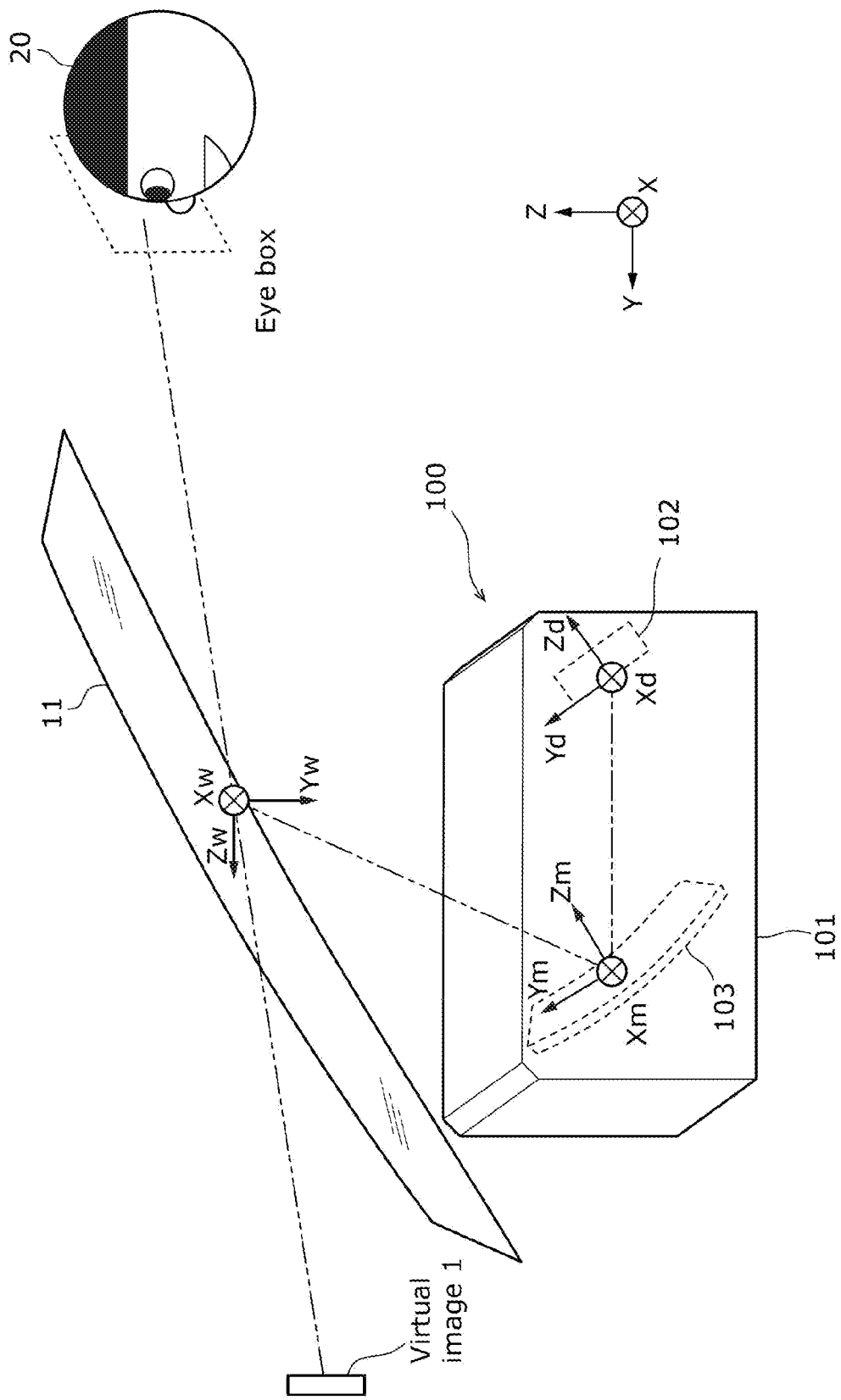
FIG. 6 is a diagram showing respective coordinate systems of the windshield, the mirror and the display used in the Numerical examples.

FIG. 6 is a diagram showing respective coordinate systems of windshield 11, mirror 103, and display 102 used in the Numerical examples.

For example, the coordinate system of windshield 11 includes an origin near the intersection between the line segment connecting observer 20 with virtual image 1 and windshield 11. In addition, the coordinate system of windshield 11 includes an Xw axis along the left-right direction, a Yw axis along the vertical direction, and a Zw axis perpendicular to the Xw and Yw axes. The coordinate system of each of windshield 11 and mirror 103 is defined by the coordinate system of display 102.

Figure 7:
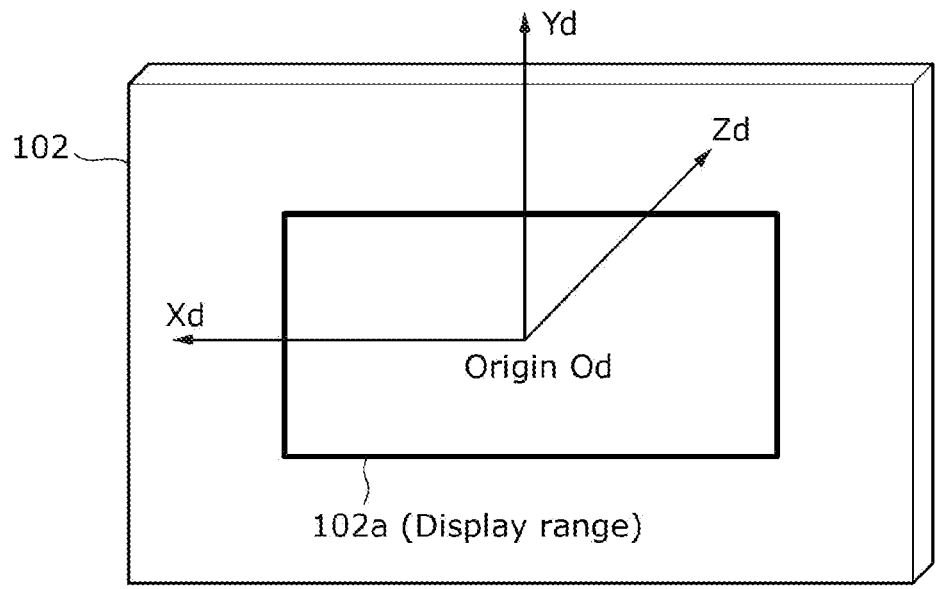
FIG. 7 is a diagram showing an example of the coordinate system of the display used in Numerical examples.

FIG. 7 is a diagram showing an example of the coordinate system of display 102.

The coordinate system of display 102 is a coordinate system having center Od of display surface 102a as an origin, and includes an Xd axis and a Yd axis that are parallel to display surface 102a and perpendicular to each other at the origin, and a Zd axis that is perpendicular to display surface 102a.

Figure 8:
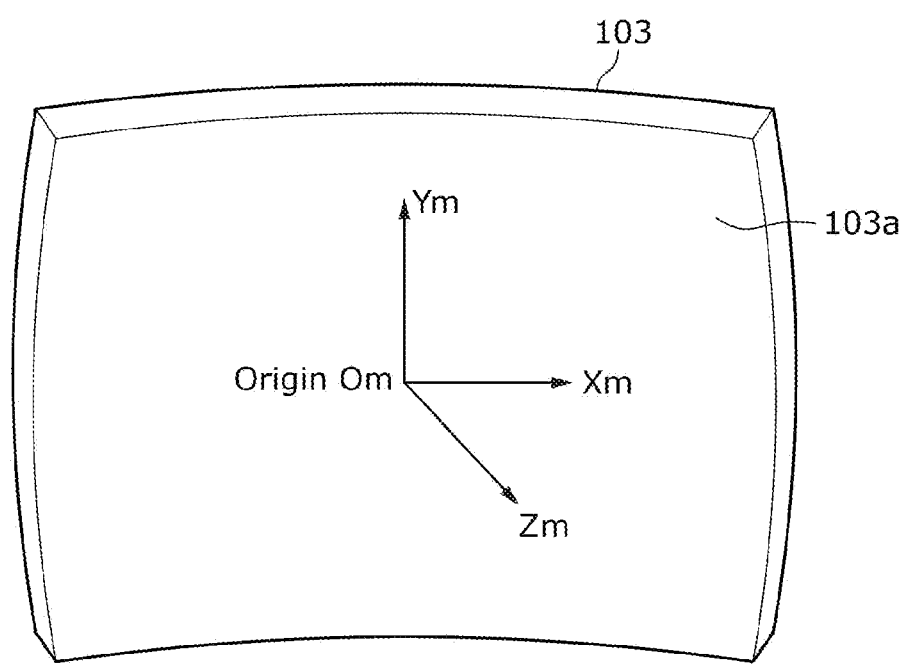
FIG. 8 is a diagram showing an example of the coordinate system of the mirror used in a numerical embodiment.

FIG. 8 is a diagram showing an example of the coordinate system of mirror 103.

The coordinate system of mirror 103 is the mirror coordinate system mentioned above, and includes Xm, Ym, and Zm axes that intersect with each other at origin Om. It should be noted that the Zm-axis is an axis perpendicular to each of the Xm-axis and the Ym-axis and along the normal direction of the tangent plane at origin Om.

It should be noted that in the Numerical examples described below, the unit of length in the table is (mm) and the unit of angle is (degree). In addition, the free-form surface is defined by the following (Equation 1).

[Math. 1]

$$z = \frac{cr^2}{\sqrt{1-(1+k)c^2r^2}} + \sum_{j=2} c_j x^m y^n \quad \text{(Equation 1)}$$

[Math. 2]

$$j = \frac{(m+n)^2 + m + 3n}{2} + 1 \quad \text{(Equation 2)}$$

Here z is the amount of sag at the position (x, y) from the axis defining the surface, r is the radius of curvature at the origin of the axis defining the surface, c is the curvature at the origin of the axis defining the surface, k is the conic constant, m and n are integers satisfying (Equation 2), and $c_j$ are the coefficients of the monomial $x^m y^n$. It should be noted that $r^2$ is equal to $x^2+y^2$.

In addition, in each Numerical example, the reference coordinate origin is center Od of display surface 102a of display 102, and the Xd axis, Yd axis, and Zd axis are defined as shown in FIG. 7.

Furthermore, the eccentricity data in each Numerical example is shown with reference to the coordinate system of display 102 (the coordinate system having the Xd-axis, Yd-axis and Zd-axis). Furthermore, in the eccentricity data, ADE means the amount of rotation from the Zd-axis direction to the Yd-axis direction about the Xd-axis, BDE means the amount of rotation from the Xd-axis direction to the Zd-axis direction about the Yd-axis, and CDE means the amount rotation from the Xd-axis direction to the Yd-axis direction about the Zd-axis. For example, ADE, BDE, and CDE indicate Euler angles rotated in the order ADE, BDE, and CDE.

Numerical Example 1

The projection optical system of Numerical example 1 is an example of the projection optical system of the embodiment described above. Table 1 shows configuration data of the projection optical system of Numerical example 1, and Table 2 shows the coefficients of the polynomial free-form surface. It should be noted that Table 2 shows the values of c and $c_j$ when the XY polynomial is considered in the coordinate system of mirror 103 (the coordinate system having the Xm, Ym, and Zm axes) and the coordinate system of windshield 11 (the coordinate system having the Xw, Yw, and Zw axes).

TABLE 1

| Face | | | Eccentricity data | | | | | |
|---|---|---|---|---|---|---|---|---|
| | number | Shape | X | Y | Z | ADE | BDE | CDE |
| Display surface | 1 | — | 0 | 0 | 0 | 0 | 0 | 0 |
| Mirror | 2 | Free-form surface | 0 | 55.84083 | −109.5938 | −4.9627 | −2.0534 | 3.4381 |

TABLE 1-continued

| Face | | Eccentricity data | | | | | |
|---|---|---|---|---|---|---|---|
| | number | Shape | X | Y | Z | ADE | BDE | CDE |
| Windshield | 3 | Free-form surface | 20.06948 | 147.62776 | 179.758 | 142.8457 | 8.2596 | −5.0614 |
| Observer | 4 | — | 149.34785 | −362.44252 | 961.25629 | 142.8457 | 8.2596 | −5.0614 |

TABLE 2

| Face number | c (Curvature) | Polynomial coefficient | | | | | |
|---|---|---|---|---|---|---|---|
| | | −5.2247E−03 | | | | | |
| 2 | C1 | 0.0000E+00 | C19 | −1.9235E−10 | | | |
| | C2 | 0.0000E+00 | C20 | −1.2202E−11 | | | |
| | C3 | 0.0000E+00 | C21 | 2.4206E−10 | | | |
| | C4 | 4.4582E−03 | C22 | 0.0000E+00 | | | |
| | C5 | −6.4688E−05 | C23 | 0.0000E+00 | | | |
| | C6 | 4.1186E−03 | C24 | 0.0000E+00 | | | |
| | C7 | −4.1344E−07 | C25 | 0.0000E+00 | | | |
| | C8 | −1.8886E−06 | C25 | 0.0000E+00 | | | |
| | C9 | −3.5343E−07 | C27 | 0.0000E+00 | | | |
| | C10 | −2.3933E−06 | C28 | 0.0000E+00 | | | |
| | C11 | 2.4624E−08 | C29 | 0.0000E+00 | | | |
| | C12 | 6.4440E−10 | C30 | 0.0000E+00 | | | |
| | C13 | 4.3591E−08 | C31 | 0.0000E+00 | | | |
| | C14 | 3.0708E−11 | C32 | 0.0000E+00 | | | |
| | C15 | 1.7978E−08 | C33 | 0.0000E+00 | | | |
| | C16 | −1.3714E−12 | C34 | 0.0000E+00 | | | |
| | C17 | −5.0334E−12 | C35 | 0.0000E+00 | | | |
| | C18 | −3.5970E−12 | C36 | 0.0000E+00 | | | |

| Face number | c (Curvature) | Polynomial coefficient | | | | | |
|---|---|---|---|---|---|---|---|
| | | −2.0000E−03 | | | | | |
| 3 | C1 | 0.0000E+00 | C19 | −1.8670E−13 | C37 | 5.3682E−20 |
| | C2 | −1.3000E−01 | C20 | −9.2565E−13 | C38 | 1.2527E−22 |
| | C3 | 1.8000E+00 | C21 | −2.5314E−12 | C39 | 3.9397E−22 |
| | C4 | 9.8046E−04 | C22 | 1.8279E−15 | C40 | 2.8038E−22 |
| | C5 | 4.5168E−05 | C23 | 9.5675E−17 | C41 | 2.6573E−22 |
| | C6 | 7.5454E−04 | C24 | 9.8108E−15 | C42 | 2.0693E−22 |
| | C7 | −8.1336E−09 | C25 | 9.6890E−17 | C43 | 4.9582E−23 |
| | C8 | 4.5401E−08 | C26 | 7.8540E−15 | C44 | −1.7041E−22 |
| | C9 | 2.0246E−08 | C27 | 9.4742E−16 | C45 | −1.5740E−22 |
| | C10 | −2.9576E−07 | C28 | −4.2755E−14 | | |
| | C11 | 1.5657E−09 | C29 | −1.7906E−18 | | |
| | C12 | 9.7194E−12 | C30 | −1.7753E−18 | | |
| | C13 | 3.2866E−09 | C31 | −4.0277E−17 | | |
| | C14 | −1.4766E−10 | C32 | 2.7366E−17 | | |
| | C15 | 2.0349E−10 | C33 | −8.0966E−17 | | |
| | C16 | −1.4659E−14 | C34 | 5.8355E−17 | | |
| | C17 | 1.6653E−13 | C35 | −1.0393E−16 | | |
| | C18 | −7.6825E−15 | C36 | 2.4111E−16 | | |

Numerical Example 2

The projection optical system of Numerical example 2 is an example of the projection optical system of the embodiment described above. Table 3 shows configuration data of the projection optical system of Numerical example 2, and Table 4 shows the coefficients of the polynomial free-form surface.

TABLE 3

| Face | | Eccentricity data | | | | | |
|---|---|---|---|---|---|---|---|
| | number | Shape | X | Y | Z | ADE | BDE | CDE |
| Display surface | 1 | — | 0 | 0 | 0 | 0 | 0 | 0 |
| Mirror | 2 | Free-form surface | 0 | 55.05465 | −118.06507 | 0.8196 | 7.5478 | 2.0112 |
| Windshield | 3 | Free-form surface | −112.6926 | 184.44385 | 341.75422 | 150.6615 | −13.2343 | −1.4348 |
| Observer | 4 | — | −252.44167 | −142.68206 | 844.42287 | 150.6615 | −13.2343 | −1.4348 |

TABLE 4

| Face number | c (Curvature) | Polynomial coefficient −4.5536E−03 | | | Face number | c (Curvature) | Polynomial coefficient −2.5000E−04 | | |
|---|---|---|---|---|---|---|---|---|---|
| 2 | C1 | 0.0000E+00 | C19 | −2.9758E−11 | 3 | C1 | 0.0000E+00 | C19 | 8.3529E−13 |
|  | C2 | 0.0000E+00 | C20 | 1.0628E−10 |  | C2 | 2.0000E−01 | C20 | 1.0189E−12 |
|  | C3 | 0.0000E+00 | C21 | 3.9294E−11 |  | C3 | 1.8000E+00 | C21 | 4.8374E−12 |
|  | C4 | 3.9834E−03 | C22 | 1.1267E−13 |  | C4 | −2.3881E−04 | C22 | 4.5834E−24 |
|  | C5 | 1.0324E−04 | C23 | −5.3348E−14 |  | C5 | 7.7174E−06 | C23 | 2.7812E−24 |
|  | C5 | 3.6308E−03 | C24 | 5.5531E−13 |  | C6 | −4.6710E−04 | C24 | −2.7585E−17 |
|  | C7 | 8.6326E−07 | C25 | 1.6219E−13 |  | C7 | 3.2832E−07 | C25 | −3.5127E−24 |
|  | C8 | −2.2525E−06 | C26 | −4.5153E−13 |  | C8 | 1.4354E−08 | C26 | 6.0186E−18 |
|  | C9 | 5.6735E−07 | C27 | 3.8701E−13 |  | C9 | 2.0121E−07 | C27 | −1.1646E−24 |
|  | C10 | −1.7746E−06 | C28 | −6.2731E−12 |  | C10 | 1.7918E−06 | C28 | −3.4152E−19 |
|  | C11 | 1.7451E−08 | C29 | 6.5812E−17 |  | C11 | −1.9350E−10 | C29 | 0.0000E+00 |
|  | C12 | −1.3106E−09 | C30 | −3.4169E−16 |  | C12 | −8.8408E−11 | C30 | 0.0000E+00 |
|  | C13 | 3.2950E−08 | C31 | −1.6117E−15 |  | C13 | −2.6670E−10 | C31 | 0.0000E+00 |
|  | C14 | −4.5849E−09 | C32 | −1.5392E−16 |  | C14 | −6.6363E−10 | C32 | 0.0000E+00 |
|  | C15 | 3.4558E−08 | C33 | −9.7940E−15 |  | C15 | −4.3608E−09 | C33 | 0.0000E+00 |
|  | C16 | 5.1895E−12 | C34 | 9.1627E−15 |  | C16 | −2.0685E−14 | C34 | 0.0000E+00 |
|  | C17 | −2.4882E−12 | C35 | 1.6185E−16 |  | C17 | 1.4925E−14 | C35 | 0.0000E+00 |
|  | C18 | 3.9013E−11 | C36 | 2.7859E−14 |  | C18 | 1.2617E−13 | C36 | 0.0000E+00 |

Numerical Example 3

The projection optical system of Numerical example 3 is an example of the projection optical system of the embodiment described above. Table 5 shows configuration data of the projection optical system of Numerical example 3, and Table 6 shows the coefficients of the polynomial free-form surface.

Numerical Example 4

The projection optical system of Numerical example 4 is an example of the projection optical system of the embodiment described above. Table 7 shows configuration data of the projection optical system of Numerical example 4, and Table 8 shows the coefficients of the polynomial free-form surface.

TABLE 5

| Face number | Shape | Eccentricity data | | | | | |
|---|---|---|---|---|---|---|---|
|  |  | X | Y | Z | ADE | BDE | CDE |
| Display surface 1 | — | 0 | 0 | 0 | 0 | 0 | 0 |
| Mirror 2 | Free-form surface | 0 | 100.50137 | −215.52589 | −1.3280 | 4.2556 | 4.4305 |
| Windshield 3 | Free-form surface | −66.30114 | 194.91231 | 264.33139 | 146.7391 | −11.0134 | 4.0484 |
| Observer 4 | — | −186.40391 | −168.09571 | 747.0502 | 146.7391 | −11.0134 | 4.0484 |

TABLE 6

| Face number | c (Curvature) | Polynomial coefficient −3.7916E−03 | | | Face number | c (Curvature) | Polynomial coefficient −2.5000E−04 | | |
|---|---|---|---|---|---|---|---|---|---|
| 2 | C1 | 0.0000E+00 | C19 | −2.9376E−12 | 3 | C1 | 0.0000E+00 | C19 | 8.3529E−13 |
|  | C2 | 0.0000E+00 | C20 | 2.8157E−12 |  | C2 | 2.0000E−01 | C20 | 1.0189E−12 |
|  | C3 | 0.0000E+00 | C21 | −4.4147E−11 |  | C3 | 1.8000E+00 | C21 | 4.8374E−12 |
|  | C4 | 2.8920E−03 | C22 | 6.4106E−14 |  | C4 | −2.3881E−04 | C22 | 4.5834E−24 |
|  | C5 | 3.4587E−05 | C23 | −5.9332E−15 |  | C5 | 7.7174E−06 | C23 | 2.7812E−24 |
|  | C6 | 2.7463E−03 | C24 | 2.2550E−13 |  | C6 | −4.6710E−04 | C24 | −2.7585E−17 |
|  | C7 | 1.7011E−07 | C25 | −6.5749E−14 |  | C7 | 3.2832E−07 | C25 | −3.5127E−24 |
|  | C8 | −6.8560E−06 | C26 | −1.1930E−13 |  | C8 | 1.4354E−08 | C26 | 6.0186E−18 |
|  | C9 | 1.3339E−07 | C27 | −1.0118E−12 |  | C9 | 2.0121E−07 | C27 | −1.1646E−24 |
|  | C10 | −4.4154E−07 | C28 | −2.3504E−12 |  | C10 | 1.7918E−06 | C28 | −3.4152E−19 |
|  | C11 | 7.6093E−09 | C29 | 2.2431E−17 |  | C11 | −1.9350E−10 | C29 | 0.0000E+00 |
|  | C12 | 2.6168E−10 | C30 | 6.2908E−17 |  | C12 | −8.8408E−11 | C30 | 0.0000E+00 |
|  | C13 | 1.5019E−08 | C31 | 1.1215E−16 |  | C13 | −2.6670E−10 | C31 | 0.0000E+00 |
|  | C14 | 2.5061E−09 | C32 | 2.2044E−16 |  | C14 | −6.6363E−10 | C32 | 0.0000E+00 |
|  | C15 | 1.7283E−08 | C33 | 8.1971E−16 |  | C15 | −4.3608E−09 | C33 | 0.0000E+00 |
|  | C16 | −4.1641E−13 | C34 | 2.7540E−15 |  | C16 | −2.0685E−14 | C34 | 0.0000E+00 |
|  | C17 | −2.6539E−12 | C35 | 5.2325E−15 |  | C17 | 1.4925E−14 | C35 | 0.0000E+00 |
|  | C18 | −3.3691E−12 | C36 | 1.5626E−14 |  | C18 | 1.2617E−13 | C36 | 0.0000E+00 |

TABLE 7

| Face | | | | Eccentricity data | | | | |
|---|---|---|---|---|---|---|---|---|
| | number | Shape | X | Y | Z | ADE | BDE | CDE |
| Display surface | 1 | — | 0 | 0 | 0 | 0 | 0 | 0 |
| Mirror | 2 | Free-form surface | 4.24393 | 67.91698 | −117.63566 | 2.1836 | −2.3958 | 8.7597 |
| Windshield | 3 | Free-form surface | 54.41842 | 210.16393 | 127.79639 | 159.8878 | 6.5189 | −3.7908 |
| Observer | 4 | — | 144.14311 | −28.30845 | 903.20112 | 159.8878 | 6.5189 | −3.7908 |

TABLE 8

| | Polynomial coefficient | | | | | Polynomial coefficient | | | |
|---|---|---|---|---|---|---|---|---|---|
| Face number | c (Curvature) | −2.6236E−03 | | | Face number | c (Curvature) | 1.3839E−05 | | |
| 2 | C1 | 0.0000E+00 | C19 | −6.1236E−11 | 3 | C1 | 0.0000E+00 | C19 | −8.7683E−13 |
| | C2 | 0.0000E+00 | C20 | −5.6826E−11 | | C2 | −1.8000E−01 | C20 | 5.7515E−13 |
| | C3 | 0.0000E+00 | C21 | 4.8076E−11 | | C3 | 1.8000E+00 | C21 | 2.8237E−13 |
| | C4 | 2.9317E−03 | C22 | −4.9506E−14 | | C4 | −5.0000E−04 | C22 | −8.3950E−20 |
| | C5 | −1.7722E−04 | C23 | −1.3834E−14 | | C5 | 2.0000E−04 | C23 | −7.2989E−19 |
| | C6 | 2.3907E−03 | C24 | −4.0086E−13 | | C6 | −7.0000E−04 | C24 | 3.4403E−18 |
| | C7 | −7.9517E−07 | C25 | −4.3507E−13 | | C7 | −4.9941E−08 | C25 | −4.4326E−18 |
| | C8 | −2.3673E−06 | C26 | −7.1582E−13 | | C8 | 2.8587E−07 | C26 | −4.4308E−18 |
| | C9 | −1.4918E−07 | C27 | −1.0655E−12 | | C9 | −3.7031E−07 | C27 | 9.8761E−18 |
| | C10 | −1.0015E−06 | C28 | −2.2458E−12 | | C10 | 1.5937E−06 | C28 | −1.5607E−18 |
| | C11 | 8.9774E−09 | C29 | 1.1089E−16 | | C11 | −1.7995E−11 | C29 | 0.0000E+00 |
| | C12 | 2.1109E−09 | C30 | −4.4372E−16 | | C12 | −8.8877E−11 | C30 | 0.0000E+00 |
| | C13 | 2.0561E−08 | C31 | 1.7126E−15 | | C13 | −5.5794E−10 | C31 | 0.0000E+00 |
| | C14 | 6.6934E−09 | C32 | 1.0653E−15 | | C14 | −3.8624E−10 | C32 | 0.0000E+00 |
| | C15 | 1.8556E−08 | C33 | −9.0626E−16 | | C15 | −2.1592E−09 | C33 | 0.0000E+00 |
| | C16 | −9.6044E−12 | C34 | 2.8902E−15 | | C16 | 7.9040E−15 | C34 | 0.0000E+00 |
| | C17 | 6.2239E−12 | C35 | 5.9840E−15 | | C17 | 6.4549E−15 | C35 | 0.0000E+00 |
| | C18 | −4.1791E−11 | C36 | −1.2305E−14 | | C18 | −3.6635E−14 | C36 | 0.0000E+00 |

Numerical Example 5

The projection optical system of Numerical example 5 is an example of the projection optical system of the embodiment described above. Table 9 shows configuration data of the projection optical system of Numerical example 5, and Table 10 shows the coefficients of the polynomial free-form surface.

TABLE 9

| Face | | | | Eccentricity data | | | | |
|---|---|---|---|---|---|---|---|---|
| | number | Shape | X | Y | Z | ADE | BDE | CDE |
| Display surface | 1 | — | 0 | 0 | 0 | 0 | 0 | 0 |
| Mirror | 2 | Free-form surface | 0 | 52.59805 | −112.79688 | −1.0496 | 8.4844 | 6.2967 |
| Windshield | 3 | Free-form surface | −88.53208 | 176.79179 | 180.32855 | 150.8912 | −19.1735 | 2.2011 |
| Observer | 4 | — | −333.10297 | −142.64239 | 811.23596 | 150.8912 | −19.1735 | 2.2011 |

TABLE 10

| | Polynomial coefficient | | | | | Polynomial coefficient | | | |
|---|---|---|---|---|---|---|---|---|---|
| Face number | c (Curvature) | −5.3311E−03 | | | Face number | c (Curvature) | −6.6667E−04 | | |
| 2 | C1 | 0.0000E+00 | C19 | −8.9295E−11 | 3 | C1 | 0.0000E+00 | C19 | 2.3129E−12 |
| | C2 | 0.0000E+00 | C20 | −3.5188E−11 | | C2 | 2.5000E−01 | C20 | 2.9668E−12 |
| | C3 | 0.0000E+00 | C21 | −3.3128E−10 | | C3 | 2.0000E+00 | C21 | 6.8080E−12 |
| | C4 | 4.4433E−03 | C22 | 2.9965E−13 | | C4 | 1.0917E−04 | C22 | −1.1910E−18 |
| | C5 | −5.7246E−05 | C23 | −1.2358E−13 | | C5 | 0.0000E+00 | C23 | −2.3045E−19 |
| | C6 | 3.7794E−03 | C24 | 6.3289E−13 | | C6 | −6.5000E−04 | C24 | 3.4364E−16 |
| | C7 | 1.0020E−06 | C25 | −7.9026E−14 | | C7 | 6.0218E−08 | C25 | −4.0749E−19 |
| | C8 | −1.1997E−06 | C26 | 1.1536E−12 | | C8 | 1.5787E−07 | C26 | −1.4753E−16 |
| | C9 | 2.6716E−06 | C27 | −1.8196E−12 | | C9 | 6.0784E−07 | C27 | 8.9108E−20 |
| | C10 | 7.8801E−07 | C28 | −9.2710E−12 | | C10 | 2.2480E−06 | C28 | 6.1866E−18 |
| | C11 | 2.4248E−08 | C29 | −1.4407E−16 | | C11 | 1.1056E−10 | C29 | 0.0000E+00 |
| | C12 | −3.4205E−09 | C30 | 7.3189E−16 | | C12 | −1.7333E−10 | C30 | 0.0000E+00 |

TABLE 10-continued

| Face number | c (Curvature) | Polynomial coefficient | | −5.3311E−03 | Face number | c (Curvature) | Polynomial coefficient | | −6.6667E−04 |
|---|---|---|---|---|---|---|---|---|---|
| | C13 | 4.3852E−08 | C31 | 3.5379E−15 | | C13 | −9.0527E−10 | C31 | 0.0000E+00 |
| | C14 | −6.7847E−09 | C32 | 1.2265E−14 | | C14 | −1.6453E−09 | C32 | 0.0000E+00 |
| | C15 | 3.7514E−08 | C33 | −4.5297E−15 | | C15 | −4.7206E−09 | C33 | 0.0000E+00 |
| | C16 | 7.3029E−12 | C34 | −1.8891E−14 | | C16 | 3.6689E−15 | C34 | 0.0000E+00 |
| | C17 | −2.3687E−11 | C35 | 1.3871E−15 | | C17 | 3.6281E−13 | C35 | 0.0000E+00 |
| | C18 | −3.5954E−11 | C36 | 1.2276E−13 | | C18 | 5.3743E−13 | C36 | 0.0000E+00 |

SPECIFICATIONS OF NUMERICAL EXAMPLES

Table 11 shows the specifications of each of Numerical examples 1 to 5 mentioned above. It should be noted that field of view (FOV) in Table 11 indicates the viewing angle, and the display usage range indicates the horizontal width (width in the Xd-axis direction) and vertical width (width in the Yd-axis direction) of display surface 102a. The pupil-to-virtual image distance indicates the distance from the pupil of observer 20 to virtual image 1. The eye box size indicates the horizontal width (width in the X-axis direction) and vertical width (width in the Y-axis direction) of the eye box of observer 20. The display center position viewed from the mirror coordinate system indicates the position of center Od of display surface 102a when the mirror coordinate system is viewed from the Zm-axis direction of the mirror coordinate system.

TABLE 11

| | | Example 1 | Example 2 | Example 3 | Example 4 | Example 5 |
|---|---|---|---|---|---|---|
| FOV (deg.) | X | 5 | 10 | 10 | 12 | 8 |
| | Y | 2 | 3 | 3 | 3 | 3 |
| Display usage range (mm) | X | 28.7995 | 54.8806 | 56.4943 | 74.9684 | 43.5782 |
| | Y | 15.6218 | 29.7641 | 20.4597 | 31.6377 | 28.4431 |
| Pupil-to-virtual Image distance (mm) | | 2100 | 2000 | 7000 | 2000 | 2000 |
| Eye box size (mm) | X | 130 | 130 | 130 | 130 | 130 |
| | Y | 50 | 40 | 40 | 40 | 40 |
| Display center position viewed from mirror coordinate system | X | −6.8455 | 13.4025 | 8.73773 | −19.959 | 11.1389 |
| | Y | −45.823 | −57.244 | −96.443 | −70.128 | −52.059 |
| Steering wheel left or right | | Right | Left | Left | Right | Left |

Figure 9:
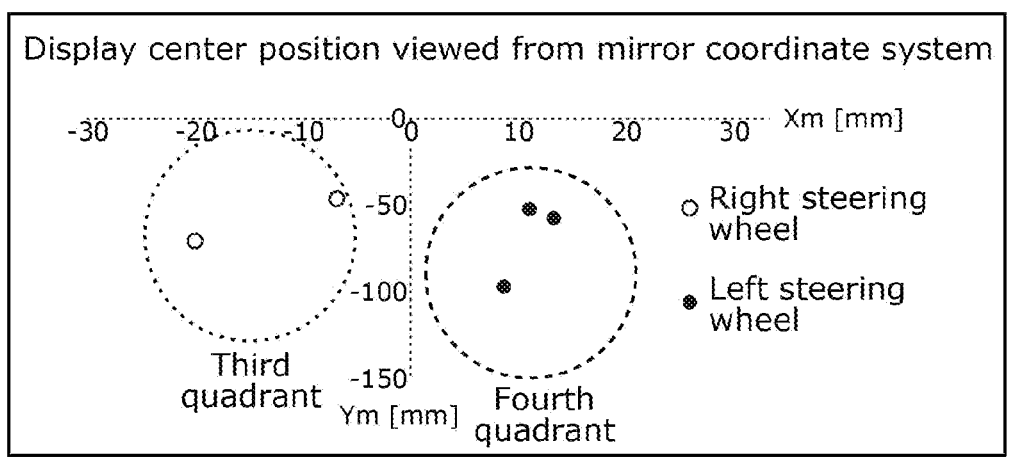
FIG. 9 is a diagram showing the position of the center of the display in the mirror coordinate system.

FIG. 9 is a diagram showing the position of center Od of display 102 in the mirror coordinate system.

As shown in FIG. 9, in the case of the right steering wheel, center Od of display surface 102a of display 102 is in the third quadrant of the mirror coordinate system. In addition, in the case of the left steering wheel, center Od of display surface 102a of display 102 is in the fourth quadrant of the mirror coordinate system.
(Variations)

Although the head-up display of the present disclosure has been described based on the embodiment described above, the present disclosure is not limited to the embodiment described above. Forms obtained by applying various modifications to the above embodiment conceived by a person skilled in the art without departing from the spirit of the present disclosure may also be included in the present disclosure.

For example, in the embodiment described above, mirror 103 reflects the image light from display 102 toward windshield 11, but if vehicle 10 is equipped with a combiner, mirror 103 may reflect it toward the combiner.

In addition, head-up display 100 in the embodiment described above may include infrared (IR) cut glass or a polarizing filter (also referred to as a half wave plate). For example, IR cut glass or the like is attached to display 102 so as to cover display surface 102a. That is, if windshield 11 and mirror 103 are the only optical elements with a power of 0.001 or more in the central optical path from display 102 to observer 20, head-up display 100 may include one or more optical elements with less than the power. It should be noted that the power is a numerical value expressed by the reciprocal of the focal length.

While the embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-029650 filed on Feb. 26, 2021, and PCT International Application No. PCT/JP2021/045385 filed on Dec. 9, 2021.

INDUSTRIAL APPLICABILITY

The present disclosure can be used, for example, for head-up displays mounted on, for example, vehicles or the like.

What is claimed is:

1. A head-up display mounted on a vehicle comprising:
a display that emits light showing an image from a display surface; and a reflecting member, wherein the head-up display is configured such that the image is seen as a virtual image by an observer through a windshield by the light emitted from the display surface of the display toward the reflecting member being reflected only by a reflecting surface of the reflecting member toward the windshield, and further being reflected by the windshield toward the observer, the windshield being disposed above the reflecting member, the display surface of the display is directed downward from a direction toward the reflecting member from the display, and a center of the display surface of the display is located below a center of gravity of the reflecting surface of the reflecting member, in a coordinate system on a tangential plane tangential to the center of gravity of the reflecting surface of the reflecting member, the coordinate system having the center of gravity of the reflecting surface as an origin, the coordinate system having an X-axis and a Y-axis orthogonal to each other at the origin, the coordinate system having the X-axis which is along a left-right direction, when the reflecting surface is viewed from a side of the display in a direction perpendicular to the tangential plane, when a steering wheel of the vehicle is a left steering wheel attached on a left side of the vehicle, the center of the display surface of the display is located in a fourth quadrant of the coordinate system, when the steering wheel of the vehicle is a right steering wheel attached on a right side of the vehicle, the center of the display surface of the display is located in a third quadrant of the coordinate system, a length of an optical path from an upper right end of the display surface to the observer via an upper right end of the reflective surface and a lower right end of an irradiation range of the windshield is substantially equal to a length of an optical path from a lower right end of the display surface to the observer via a lower right end of the reflective surface and an upper right end of the irradiation range of the windshield, and a length of an optical path from an upper left end of the display surface to the observer via an upper left end of the reflective surface and a lower left end of the irradiation range of the windshield is substantially equal to a length of an optical path from a lower left end of the display surface to the observer via a lower left end of the reflective surface and an upper left end of the irradiation range of the windshield.

2. The head-up display according to claim 1 further comprising:

a housing that accommodates the display and the reflecting member.

* * * * *